United States Patent
Goustiaux et al.

(10) Patent No.: US 9,546,289 B2
(45) Date of Patent: Jan. 17, 2017

(54) INK COMPOSITION FOR CONTINUOUS DEFLECTED INK JET PRINTING NOTABLY ON SUBSTRATES MADE OF ORGANIC POLYMERS

(71) Applicant: Markem-Imaje Holding, Bourg-les-Valence (FR)

(72) Inventors: Cécile Goustiaux, Saint Marcellin (FR); Antoine Bataille, Loriol sur Drôme (FR)

(73) Assignee: MARKEM-IMAJE HOLDING, Bourg-les-Valence (FR)

( * ) Notice: Subject to any disclaimer, the term of this patent is extended or adjusted under 35 U.S.C. 154(b) by 61 days.

(21) Appl. No.: 14/442,476

(22) PCT Filed: Nov. 14, 2013

(86) PCT No.: PCT/EP2013/073828
§ 371 (c)(1),
(2) Date: May 13, 2015

(87) PCT Pub. No.: WO2014/076181
PCT Pub. Date: May 22, 2014

(65) Prior Publication Data
US 2016/0272827 A1    Sep. 22, 2016

(30) Foreign Application Priority Data
Nov. 15, 2012   (FR) ..................... 12 60874

(51) Int. Cl.
| | |
|---|---|
| *C09D 11/102* | (2014.01) |
| *C09D 11/104* | (2014.01) |
| *C09D 11/322* | (2014.01) |
| *C09D 11/328* | (2014.01) |
| *C09D 11/36* | (2014.01) |
| *C09D 11/38* | (2014.01) |
| *C08J 7/04* | (2006.01) |

(52) U.S. Cl.
CPC .............. *C09D 11/102* (2013.01); *C08J 7/047* (2013.01); *C09D 11/104* (2013.01); *C09D 11/36* (2013.01); *C08J 2323/06* (2013.01); *C08J 2465/00* (2013.01); *C08J 2467/00* (2013.01)

(58) Field of Classification Search
CPC ... C09D 11/102; C09D 11/104; C09D 11/322; C09D 11/328; C09D 11/36; C09D 11/38
USPC .................. 106/31.27, 31.58, 31.6, 31.86
See application file for complete search history.

(56) References Cited

U.S. PATENT DOCUMENTS

| | | |
|---|---|---|
| 4,024,096 A | 5/1977 | Wachtel |
| 4,153,593 A | 5/1979 | Zabiak |
| 4,155,767 A | 5/1979 | Specht |
| 4,155,895 A | 5/1979 | Rohowetz |
| 4,166,044 A | 8/1979 | Germonprez |
| 4,207,577 A | 6/1980 | Mansukhani |
| 4,260,531 A | 4/1981 | Wachtel |
| 4,465,800 A | 8/1984 | Bhatia |
| 4,567,213 A | 1/1986 | Bhatia |
| 4,680,058 A * | 7/1987 | Shimizu ................ C09D 11/36 106/31.86 |
| 4,756,758 A | 7/1988 | Lent |
| 4,834,799 A | 5/1989 | Song |
| 4,880,465 A | 11/1989 | Loria |
| 5,024,923 A | 6/1991 | Suzuki |
| 5,102,458 A | 4/1992 | Lent |
| 5,302,631 A * | 4/1994 | Yamada ................ C09D 11/36 347/100 |
| 5,316,575 A | 5/1994 | Lent |
| 5,395,431 A | 3/1995 | Siddiqui |
| 5,395,432 A | 3/1995 | Nelson |
| 5,594,044 A | 1/1997 | Yang |
| 5,637,139 A | 6/1997 | Morelos |
| 6,869,986 B1 * | 3/2005 | Millot .................... C09D 11/36 523/160 |
| 7,014,698 B2 | 3/2006 | Mizutani |
| 7,022,172 B2 | 4/2006 | Ohkawa |
| 7,132,013 B2 | 11/2006 | Mizutani |
| 7,132,014 B2 | 11/2006 | Mizutani |

(Continued)

FOREIGN PATENT DOCUMENTS

| | | |
|---|---|---|
| EP | 0 034 881 A1 | 9/1981 |
| EP | 0 289 141 A2 | 11/1988 |

(Continued)

OTHER PUBLICATIONS

Search Report issued in French Patent Application No. FR 12 60874 dated Jul. 1, 2013.
International Search Report issued in Application No. PCT/EP2013/073828 dated Jan. 15, 2014.
Written Opinion issued in Application No. PCT/EP2013/073828 dated Jan. 15, 2014.

*Primary Examiner* — Helene Klemanski
(74) *Attorney, Agent, or Firm* — Pearne & Gordon LLP

(57) ABSTRACT

An ink composition for continuous deflected ink jet printing, which is liquid at ambient temperature, comprising: a solvent comprising, preferably consisting of, one or more organic solvent compound(s), and optionally water; a binder, comprising a saturated copolyester resin and a terpene-phenol resin; a compound having an ethylenically unsaturated double bond and a silicon chain; optionally, one or more dye(s) and/or pigment(s). A method for marking a substrate, support or object by spraying this ink composition on a surface of this substrate, support or object. A substrate, support or object, notably a polyolefin bottle or stopper, cap, for example made of polyethylene, provided with a marking obtained by drying, and/or absorption in the substrate, support or object, of this ink composition.

25 Claims, No Drawings

(56) References Cited

U.S. PATENT DOCUMENTS

| | | | | |
|---|---|---|---|---|
| 7,207,669 | B2* | 4/2007 | Pavlin | C09D 11/30 347/100 |
| 7,279,511 | B2* | 10/2007 | Zhu | C09D 11/322 106/31.6 |
| 8,282,724 | B2* | 10/2012 | Goustiaux | C09D 11/38 106/31.58 |
| 2002/0100393 | A1* | 8/2002 | Moore | C09D 11/36 106/31.27 |
| 2007/0248838 | A1* | 10/2007 | De Saint-Romain | C09D 11/38 106/31.6 |
| 2008/0213518 | A1 | 9/2008 | Oyanagi | |
| 2011/0009537 | A1* | 1/2011 | Kotera | C09D 11/36 524/106 |
| 2015/0291816 | A1* | 10/2015 | Cross | C09D 11/36 524/265 |

FOREIGN PATENT DOCUMENTS

| | | |
|---|---|---|
| EP | 0 501 406 A1 | 9/1992 |
| EP | 0 510 752 A1 | 10/1992 |
| EP | 0 735 120 A2 | 10/1996 |
| EP | 2 316 890 A1 | 5/2011 |
| FR | 2 460 982 | 1/1981 |
| GB | 2 277 094 A | 10/1994 |
| GB | 2 286 402 A | 8/1995 |
| GB | 2 298 713 A | 9/1996 |
| WO | 92/14794 A1 | 9/1992 |
| WO | 92/14795 A1 | 9/1992 |
| WO | 95/29287 A1 | 11/1995 |
| WO | 96/23844 A1 | 8/1996 |

* cited by examiner

INK COMPOSITION FOR CONTINUOUS DEFLECTED INK JET PRINTING NOTABLY ON SUBSTRATES MADE OF ORGANIC POLYMERS

The invention relates to an ink composition the properties of which are particularly well-suited for liquid jet marking or printing, and most particularly for continuous deflected ink jet marking, printing.

The ink composition according to the invention may be used to mark substrates, supports and objects of all kinds.

The ink composition according to the invention is suitable in particular for marking substrates, supports and objects made of organic polymers, particularly thermoplastic polymers ("plastics"), such as polyolefins such as polyethylenes (PE) or polypropylenes (PP), or poly(ethylene terephthalate) (PET). The ink composition according to the invention is particularly suitable for marking bottles or stoppers made of organic polymers, notably polyolefins, such as polyethylenes or polypropylenes.

The ink composition according to the invention enables resistant markings to be obtained, which are notably resistant to rubbing and to common solvents such as ethanol, and which are adherent, i.e. which pass the adhesive tape peel test.

Ink jet printing is a well-known technique, which allows printing, marking or decoration of all kinds of objects, at high speed, and without any contact between these objects and the printing device, of messages which can be changed at will, such as bar codes, sell-by dates, etc., even on non-planar supports.

Ink jet printing techniques are divided into two major types, namely: the technique known as "Drop on Demand" (DOD), and the technique known as "Continuous Ink Jet" (CIJ).

We are interested more particularly in the latter technique, and more specifically in the continuous deflected ink jet printing technique.

Continuous deflected ink jet spraying, printing consists in sending pressurised ink into a cavity containing a piezoelectric crystal, from where the ink escapes through an aperture (nozzle) in the form of a jet.

The piezoelectric crystal, vibrating at a determined frequency, causes pressure disturbances in the ink jet, which oscillates and is gradually broken up into spherical drops or droplets. An electrode, positioned along the path of the jet, where it is broken up, enables these drops to be given an electrostatic charge if the ink is conductive. The drops charged in this manner are deflected in an electric field, and allow printing. Uncharged drops, which are therefore not deflected, are recovered in a groove, gutter, where the ink is sucked up, and then recycled towards the ink circuit.

This type of ink spraying in the form of a jet provides contact-free marking at high production line speed on objects which are not necessarily flat, planar, with the possibility of changing the message at will.

The technique is particularly suitable for marking and identification (sell-by dates, series numbers, batch numbers, barcodes, etc.) of industrial products on production lines.

Ink compositions which are suitable for spraying and printing, using the continuous deflected jet technique, must meet a number of criteria inherent to this technique, concerning, among other elements, viscosity, electrical conductivity, solubility in a solvent for cleaning, compatibility of the ingredients, satisfactory wetting of the supports to be marked, etc.

Particular and important criteria which ink compositions for printing by the continuous deflected ink jet technique must meet result firstly from the fact that ink consumption is low when the number of printed characters in each message is small, and secondly from the fact that the jet is continuous and that the ink is recirculated many times before being sprayed. As a consequence the ink is in contact with ambient air when non-deflected drops are sucked up, and it may absorb ambient moisture or react with the oxygen in the air, and may be modified by this means.

Despite this situation the ink must retain its essential properties both during storage and when it is being circulated in the printer.

Lastly, these inks must dry rapidly, be able to pass through the nozzle without clogging it, with a great directional stability of the jet, and also allow easy cleaning of the printing head.

The ingredients which compose current inks, for printing by the continuous deflected ink jet technique, are organic or mineral products; these are dyestuffs, such as dyes or pigments, resins or binders, in one or more solvent(s) which is/are more or less volatile, or in water, optionally one or more conductivity salt(s) and various additives.

The dyestuffs are called "dyes or pigments", depending on whether they are respectively soluble or insoluble in the solvent used.

Pigments, which are by nature insoluble, are therefore dispersed and may or may not be opaque. They give the ink its colour, its opaqueness, or particular optical properties, such as fluorescence (cf. patents or patent applications U.S. Pat. No. 4,153,593, U.S. Pat. No. 4,756,758, U.S. Pat. No. 4,880,465, EP-A-0 289 141, U.S. Pat. No. 5,395,432, GB-A-2 298 713). In certain cases the dyes also themselves give the ink sufficient conductivity that there is no requirement for a conductivity salt to be added. The dyes known under the name C. I. Solvent Black 27, 29, 35 and 45 are in this case.

Binder(s) or resin(s) is/are generally in most cases one or more solid and polymeric compound(s), and the choice of them is dictated by the solubility in the selected solvents and by their compatibility with the dyes and the other additives, but also and above all according to the properties which they give the ink film, when dry (see patents or patent applications U.S. Pat. No. 4,834,799, GB-A-2 286 402, U.S. Pat. No. 5,594,044, U.S. Pat. No. 5,316,575, WO-A-96/23844, WO-A-95/29287).

Their primary function is to give the ink adherence on as many supports as possible, or on specific supports, for example non-porous supports. They also enable the ink to be given adequate viscosity for the formation of drops from the jet, and they give the ink, or rather the marking obtained, most of its properties of resistance to physical and/or chemical aggression, in particular rubbing fastness, resistance to peeling by an adhesive tape ("Scotch"®), or resistance to other common solvents such as ethyl alcohol.

The solvent of these inks consists most frequently of a mixture comprising, on the one hand, a majority, predominant, amount of volatile and weakly viscous solvents, in order to allow very rapid drying of the markings and to adjust the viscosity to the desired value, for example from 2 to 10 mPa·s and, on the other hand, more viscous and less volatile solvents which dry more slowly, in a smaller amount, in order to prevent the ink from drying in the nozzle during phases when the printing device is not in operation, is shutdown (cf. patents or patent applications U.S. Pat. No. 4,155,767, WO-A-92 14794, WO-A-92 14 795 and U.S. Pat. No. 4,260,531).

The volatile solvents which are most often used are alcohols, ketones or esters of low molecular weight, as indicated in patents U.S. Pat. No. 4,567,213, and U.S. Pat. No. 5,637,139. Among these solvents, essentially methanol, ethanol, 1- and 2-propanol, acetone, methyl ethyl ketone ("MEK"), methyl-isobutyl ketone, ethyl acetate, and tetrahydrofuran may be mentioned.

The less volatile solvents, the role of which is in particular to delay drying, are most commonly ketones, such as cyclohexanone, the glycol ethers, mentioned in documents U.S. Pat. No. 4,024,096 and U.S. Pat. No. 4,567,213, ethers and acetals, such as furan or dioxane, mentioned in document U.S. Pat. No. 4,155,767, dimethyl formamide or dimethyl sulfoxide (U.S. Pat. No. 4,155,895), lactones (EP-A-0 034 881), N-methyl pyrrolidone (EP-A-0 735 120), glycols (WO-A-96 23844), and even aliphatic hydrocarbons (U.S. Pat. No. 4,166,044), or water, alone or in combination with other solvents, mentioned above; reference will be made, in this connection, to documents U.S. Pat. No. 4,153,593, GB-A-2 277 094 and FR-A-2 460 982.

Generally, the main or majority, predominant, solvents of inks for deflected continuous ink jet spraying, printing, must satisfy a number of criteria, in particular:

their volatility must be sufficient for the ink to dry rapidly on the support to be marked, but not too great, in order that it does not evaporate too rapidly in the printer, particularly during periods when the printer is not in operation;

their solvent power, with regards to the binders of the ink, the dyes or the pigment dispersions, and with regard to the supports to be printed, must enable the dry ink to be given satisfactory adherence;

their effects on the health of persons, namely their toxicity, noxiousness, irritant character and flammability, must be minor, limited;

they must enable an ink which possibly may be intended to be ingested to be kept sterile;

finally, they must be able to maintain ionic species such as the salts which give the ink its electrical conductivity dissolved and dissociated.

Any conductivity salt or salts give the ink the conductivity required for electrostatic deflection. On this subject reference may be made to document U.S. Pat. No. 4,465,800.

The additives include dispersants which allow dispersion of the pigments, surfactants which modify the wetting or penetrating power of the ink (U.S. Pat. No. 5,395,431), in particular those which modify or regulate the static or dynamic surface tension, such as Fluorad® FC 430 from the Company 3M®, agents which inhibit corrosion caused by the salts which confer the conductivity mentioned above (see documents EP-A-0 510 752, U.S. Pat. No. 5,102,458), or else additives which protect the ink against proliferation of bacteria and other micro-organisms: this concerns biocides, bactericides, fungicides and others, which are particularly useful in inks containing water, pH-regulating buffers (see EP-A-0 735 120), anti-foaming agents.

Furthermore, it is known that the traceability of products such as food, pharmaceutical or medical products require that various information is printed on the packaging of these products.

The affixation of markings on drinks bottles, or packagings of cosmetic products, and in particular on plastic stoppers, caps, or bottles, for example made of polyolefins and notably made of polyethylene, pose problems which are particularly difficult to solve, notably if the markings must resist not only the liquid contained in these packagings, but also inevitable rubbing by the user.

In order to ensure traceability of production, bottles are generally marked on the stopper, cap, or on the bottom of the bottle, or on any other location, with corresponding information, immediately after filling.

Continuous deflected ink jet technology is, with $CO_2$ laser marking, the most appropriate technique for this high-speed marking of various information on these curved surfaces.

For such applications, the ink for continuous deflected jet printing and the deposited marking must satisfy particular requirements, notably the following:

the ink must dry very rapidly when production rates are high;

the marking must resist handling by the consumer during the entire time that content of the packaging, such as a bottle, is being consumed;

the marking must resist liquids contained within the packaging, such as alcoholic solutions;

the marking must resist rubbing;

the marking must be adherent.

In order to test the adherence of the markings, the adhesive tape test, known as the "Scotch® test" is very commonly applied. It consists in applying an adhesive tape to the marking, and then in removing this tape. The test is positive when the marking remains on the object and is not transferred to the tape.

To obtain satisfactory adherence and also resistance of the markings obtained with the ink compositions sprayed by ink jet on substrates, such as packagings, made of organic polymers, notably made of plastics, and in particular on substrates made of polyolefins, for example made of polyethylenes or polypropylenes, it is currently necessary to apply a surface treatment to the substrate, such as a singeing treatment or a corona treatment, and/or to include halogenated compounds, notably chlorinated compounds such as resins based on vinyl chloride, in the ink composition.

There is thus a need for an ink composition for printing by the continuous deflected ink jet technique which gives markings which notably have satisfactory adherence, or even adherence which is improved compared to known ink compositions, on substrates, such as packagings, made of organic polymers, notably plastics, and in particular on substrates made of polyolefins, for example made of polyethylenes or polypropylenes, without there being any need to apply a surface treatment to the substrate, such as a singeing treatment or a corona treatment, and/or to include halogenated compounds, notably chlorinated compounds, such as resins based on vinyl chloride, in the ink composition.

There is therefore in particular a requirement for ink compositions for printing by the continuous deflected ink jet technique which gives markings having satisfactory adherence (generally determined by the test known as the "adhesive tape" test), or even improved adherence compared to known ink compositions, on the said substrates, but which are free of halogenated compounds, notably chlorinated compounds, such as resins based on vinyl chloride, where these ink compositions also enable markings to be obtained which are more resistant, notably to rubbing and to alcohol.

The aim of the invention is to provide an ink composition which is suitable for continuous deflected ink jet printing, which satisfies, among others, all the needs, requirements and criteria mentioned above, and which does not have the drawbacks, limitations, defects and disadvantages of the ink compositions of the prior art, and which overcomes the problems of the ink compositions of the prior art.

This aim and others are achieved, in accordance with the invention, by an ink composition for continuous deflected ink jet printing, which is liquid at ambient temperature, comprising:

a) a solvent comprising, preferably consisting of, one or more organic solvent compound(s), and optionally water;

b) a binder, comprising a saturated copolyester resin and a terpene-phenol resin;

c) a compound having a ethylenically unsaturated double bond and a silicon chain;

d) optionally, one or more dye(s) and/or pigment(s).

The said ink composition is advantageously free of halogenated compounds.

The expression "ambient temperature" is understood to mean, generally, a temperature of 5° C. to 30° C., preferably 10° C. to 25° C., even more preferably 15° C. to 24° C., and better still 20° C. to 23° C. It is clearly understood that the ink is liquid at atmospheric pressure.

The expression "free of halogenated compounds" is understood to mean, generally, that the ink composition according to the invention includes less than 0.1% by weight, or 0% by weight, of the total weight of the ink composition, of halogenated compounds.

The ink composition according to the invention is notably free of chlorinated compounds, such as resins based on vinyl chloride, such as poly(vinyl chloride) (PVC).

The expression "terpene-phenol resin" is understood to mean, generally, resins resulting from polycondensation of phenol and at least one terpene.

The terpene may be chosen, for example, from pinenes, such as α-pinene or β-pinene, the carenes, dipentene, limonene, and mixtures thereof. Terpenes are generally extracted from the resin of conifers such as pine.

A terpene-phenol resin which may be included in the ink composition according to the invention is, for example, the resin available under the name Dertophene T from the company Dérivés Résiniques et Terpèniques (DRT) of Dax, France (see "Technical Data Sheet" of 9 Aug. 2011).

The expression "copolyester resins" is understood to mean, generally, amorphous copolymers resulting from polycondensation of one or more diacids or of their dialkyl esters (C1 to C6), for example dimethyl on a diol, or else of one or more hydroxyacids on themselves or their lactonic form.

These copolyesters are amorphous and therefore soluble in organic solvents, unlike crystalline copolymers, which are insoluble in organic solvents.

It should be stipulated that the copolyester resins which are included in the ink composition according to the invention do not include prepolymers carrying unsaturated functional groups in order to be polymerisable by radiation, such as the polyester-acrylates.

Nor do the copolyester resins which are included in the ink composition according to the invention include the sequenced, block, copolymers, such as the polyester-polyethers or polyester-amines use as dispersing agents for the pigments.

One copolyester resin which may be included in the composition according to the invention is, for example, the resin available under the name Vylon GK 250® from the company Toyobo Vylon.

The compound having an ethylenically unsaturated double bond and a silicon chain may be chosen notably from among the polydimethylsiloxanes with acrylic functional groups, modified by a polyether; such compounds are available under the names Byk®-UV 3500 or Byk®-Silclean 3710 from the company Byk®.

The ink composition according to the invention is defined by a set of specific characteristics, features, which has never been described, or suggested, in the prior art.

According to a first fundamental characteristic, feature, the ink composition according to the invention comprises a combination of specific compounds which has never been described, or suggested, in the prior art.

In particular, the ink composition according to the invention comprises a specific binder comprising a combination of two specific compounds, namely the combination of a saturated copolyester resin, and of a terpene-phenol resin which has never been described or suggested in the prior art.

In addition, in the ink composition according to the invention this specific binder is moreover combined with a specific compound, namely a compound having an ethylenically unsaturated double bond and a silicon chain.

The incorporation of such a compound in an ink composition for continuous deflected jet printing, and the combination of this compound with the specific binder of the ink composition according to the invention, have never been described or suggested in the prior art.

The ink composition according to the invention is preferably, moreover, free of halogenated compounds.

The ink composition according to the invention satisfies, among others, the needs, requirements and demands mentioned above, and provides a solution to the problems of the ink compositions of the prior art.

According to the invention, it was observed in particular, in a surprising manner, that the specific combination of the ink according to the invention of two specific compounds in the binder, namely a saturated copolyester resin, and a terpene-phenol resin with, in addition, a compound having an ethylenically unsaturated double bond and a silicon chain, enabled ink compositions for ink jet printing by the continuous deflected jet technique to be obtained which give markings of which the adherence (generally determined by the test called the "adhesive tape" test), on organic polymers, notably, plastics, and in particular on polyolefins, for example polyethylenes or polypropylenes, is greater than that of the markings obtained with the ink compositions of the prior art, without there being any requirement, beforehand, to subject the substrate to a surface treatment, and optionally to include halogenated compounds, such as resins based on vinyl chloride, in the ink composition.

The ink compositions according to the invention also enable, in a surprising manner, more resistant markings to be obtained, notably markings which are resistant to rubbing and to alcohol in particular, on organic polymers, notably plastics, and in particular on polyolefins, for example polyethylenes or polypropylenes, than the markings obtained with the ink compositions of the prior art which do not include a binder with the combination of two specific compounds according to the invention, this binder being itself combined with a compound having an ethylenically unsaturated double bond and a silicon chain.

The compound having an ethylenically unsaturated double bond and a silicon chain, chosen notably from among the polydimethylsiloxanes with acrylic functional groups modified by a polyether, is currently used as a "surface" additive in coating formulations which can be polymerised under the action of radiation, in order to facilitate cleaning of the surface of these coatings.

Its use in an ink composition for continuous deflected jet printing, i.e. an ink composition which dries only by solvent evaporation, has not been described or suggested.

It is surprising that this compound is able to provide an adherence effect of the marking on organic polymers, such as plastics, and of resistance to peeling by tape, in the ink composition according to the invention, which is far remote from a coating composition which is polymerisable to facilitate cleaning thereof, i.e. a composition for which the aims sought are different from those which it is sought to attain with the composition of the invention.

It could not be deduced in an obvious manner from the known ink compositions that the combination of the 2 types of binder mentioned above, then their combination with the silicon compound, could give the markings a particularly satisfactory adherence, notably on substrates made of organic polymers, notably of plastics, and in particular of polyolefins, for example made of polyethylenes or polypropylenes, together with excellent resistance to rubbing and to solvents such as ethanol.

Document U.S. Pat. No. 4,207,577 thus describes opaque ink compositions for ink jet printing which comprise resins. Among the very numerous resins mentioned, polyester resins and terpene resins in general, are incidentally cited.

The precise nature of these polyester and terpene resins is not stipulated.

The particular combination of a specific terpene resin which is a terpene-phenol resin, and of a specific polyester resin which is a saturated copolyester resin, with a compound having an ethylenically unsaturated double bond and a silicon chain, is not described or suggested in any way in this document.

In addition, the ink composition of this document may also include chlorinated resins such as poly(vinyl chloride), poly(vinylidene chloride) and chlorinated rubbers.

Document U.S. Pat. No. 7,022,172 relates to an ink composition for ink jet printing which notably includes a resin and a dispersing agent. Among very many resins mentioned the terpene phenol resins are cited incidentally. The dispersing agent is in particular a polyester-amine.

There is no mention or suggestion in this document that the ink composition may include a copolyester such as the one present in the ink composition according to the invention, and a compound having an ethylenically unsaturated double bond and a silicon chain.

In addition, the ink composition of this document may include chlorinated resins such as the vinyl chloride-acetate resins.

Document U.S. Pat. No. 5,024,923 describes compositions absorbing infrared radiation which may be added to inks for ink jet printing.

These compositions may contain polyester resins and terpene resins, which are cited among very many other polymers and resins.

The cited terpene resins are not resins derived from polycondensation of phenol and terpenes, but resins obtained solely from terpenes.

There is no mention, or any suggestion, in this document that the ink composition may include a compound having an ethylenically unsaturated double bond and a silicon chain.

In addition, the ink composition of this document may include chlorinated polymers such as copolymers of vinyl chloride, or copolymers of vinylidene chloride.

Documents U.S. Pat. No. 7,132,014, U.S. Pat. No. 7,132,013, and U.S. Pat. No. 7,014,698 relate to pigmented ink compositions for ink jet printing which contain a pigment, a polymer and an organic solvent comprising a derivative of poly(alkylene glycol) and a nitrogen-containing heterocyclic compound. The polymer may be a binding resin chosen from among the acrylic resins, the polyester resins, the polyurethane resins, the vinyl chloride resins and the cellulosic resins.

The precise nature of the polyester resin is not stipulated, and there is no mention or any suggestion in these documents that this polyester resin may be a copolyester resin such as the one present in the ink composition according to the invention.

Nor is there any mention or suggestion in these documents that the ink composition may include a terpene-phenol resin such as the one present in the ink composition according to the invention, and a compound having an ethylenically unsaturated double bond and a silicon chain.

In addition, the ink compositions of these documents may include vinyl chloride resins.

According to a fundamental aspect of the invention, the ink compositions according to the invention give markings, which are resistant to rubbing, resistant to the adhesive tape test ("Scotch®" test), and resistant to rubbing in the presence of alcohol.

The ink compositions according to the invention preferably contain no chlorinated compound such as resins based on vinyl chloride.

The ink composition according to the invention advantageously comprises 0.1% to 30% by weight, preferably 2% to 20% by weight, of the total weight of the ink composition, of the saturated copolyester resin.

The ink composition according to the invention advantageously comprises 0.1% to 15% by weight, preferably 1% to 10% by weight, of the total weight of the ink composition, of the terpene-phenol resin.

The ink composition according to the invention advantageously comprises 0.01% to 5% by weight, preferably 0.01% to 2% by weight, of the total weight of the ink composition, of the compound having an ethylenically unsaturated double bond and a silicon chain.

The binder may comprise only the saturated copolyester resin and the terpene-phenol resin, meaning that the binder then consists of the saturated copolyester resin, and the terpene-phenol resin.

Or, alternatively, the binder may comprise, in addition to the saturated copolyester resin and the terpene-phenol resin, one or more other polymers and/or resins.

This or these other polymer(s) and/or resin(s) may advantageously be chosen from among the (meth)acrylic, vinylic, ketonic, hydroxyaromatic, cellulosic, styrenic or epoxy resins, the polyurethanes, the styrene-acrylates, the alkoxysilanes, and the combinations of two or more of these.

The binder advantageously represents 1% to 45% by weight, preferably 5% to 30% by weight, more preferably 10% to 20% by weight, of the total weight of the ink composition according to the invention.

The ink composition according to the invention comprises a very small quantity of water, generally less than 10% by weight, preferably less than 5%, and even more preferably less than 1% by weight, compared to the total weight of the ink composition.

The ink composition according to the invention may even be considered to be essentially water-free (0% water).

In fact, the water that is present is only added water, which is found as an impurity in the various components of the ink. The greater the degree of purity of the chosen components, the lower the water content will be.

The low water content or absence of water in the ink composition according to the invention favours the formation of the ink film when the binders and other dyes of the composition are insoluble in water, by this means improving the resistance and adherence properties of the ink.

In the composition according to the invention, the solvent generally represents at least 20% by weight of the total weight of the ink composition, the solvent preferably represents 30% to 90% by weight, more preferably 60% to 80% by weight, of the total weight of the ink composition.

The solvent comprises, and preferably consists of, one or more organic solvent compound(s) and optionally water, provided that the quantity of water satisfies the conditions mentioned above.

The said organic solvent compound(s) advantageously comprise(s) a majority (predominant) proportion by weight, compared to the total weight of the solvent (50% by weight of the total weight of the solvent or more, or even up to 100% by weight of the total weight of the solvent), of one or more volatile organic solvent compound(s), and a minority proportion by weight, compared to the total weight of the solvent, of one or more non-volatile organic solvent compound(s).

The solvent preferably consists of one or more volatile organic solvent compound(s).

The expression "volatile organic solvent compound" is generally understood to mean that this compound has a speed of evaporation of greater than 0.5 on the scale in which butyl acetate has a speed of evaporation equal to 1.

The said organic solvent compound(s) that is(are) part of the solvent is/are chosen, for example, from the alcohols, in particular the alcohols of low molecular weight, for example the aliphatic alcohols such as ethanol; the ketones, preferably of low molecular weight; the ethers of alkylene glycols; the esters of alkylene glycols and the esters of ethers of alkylene glycols, such as the acetates; dimethyl formamide; N-methyl pyrrolidone; the acetals; the esters; the linear or cyclic ethers; the aliphatic hydrocarbons, whether cyclic or linear; the aromatic hydrocarbons; and the carbonates such as propylene carbonate, ethylene carbonate and the dimethyl- and diethyl-carbonates; and mixtures thereof.

This or these solvent compound(s) preferably has/have the property of dissolving the other ingredients of the ink, notably the binder, the dyestuffs, the additives, etc.

The alcohols will preferably be chosen from among the linear or branched aliphatic alcohols of 1 to 8 carbon atoms, such as methanol, ethanol, propanol-1, propanol-2, n-butanol, butanol-2, tert-butanol, etc.

The ketones will preferably be chosen from among the ketones with 3 to 10 carbon atoms, such as acetone, butanone (methyl-ethyl-ketone), pentanone-2 (methyl-propyl-ketone), methyl-3 butanone-2 (methyl-isopropyl ketone) and methyl-4 pentanone-2 (methyl-isobutyl-ketone).

The ethers of alkylene glycols are preferably chosen from among the mono-alkyl ethers (C1 to C6 alkyl group) or dialkyl ethers (C1 to C6 alkyl groups) of alkylene glycol comprising 1 to 10 carbon atoms in the alkylene chain; these are preferably ethers of ethylene glycol or propylene glycol, such as methoxy-propanol.

The esters of alkylene glycols and the esters of ethers of alkylene glycols are preferably chosen from among the esters of the latter with the saturated aliphatic, carboxylic acids with 1 to 6 carbon atoms, such as formic acid, acetic acid, propionic acid, butyric acid, valeric acid and caproic acid.

Methoxypropyl acetate, butyldiglycol acetate, etc., may for example be mentioned.

The esters are chosen, preferably, from among the esters of low molecular weight such as the formates, the acetates, the propionates or the butyrates of alcohols with 1 to 10 carbon atoms.

The acetals are preferably chosen from among the acetals of low molecular mass such as ethylal and methylal.

The ethers are preferably chosen from among the ethers of low molecular mass such as dioxolane or tetrahydrofuran.

Those skilled in the art will easily be able to identify from among these solvent compounds those which are volatile and those which are non-volatile.

A preferred solvent according to the invention comprises a majority amount by weight, compared to the total weight of the solvent, and preferably consists of, one or more solvent compound(s) chosen from among the ketones with 3 to 10 carbon atoms such as acetone, butanone (methyl-ethyl-ketone or MEK), pentanone-2 (methyl-propyl-ketone), methyl-3 butanone-2 (methyl-isopropyl-ketone) and methyl-4 pentanone-2 (methyl-isobutyl-ketone or MIK).

A particularly preferred solvent comprises a majority amount by weight, compared to the total weight of the solvent, of MEK, and preferably consists of MEK.

This preferred solvent may further comprise one or more other solvent compound(s) other than the ketone(s) in a minority total amount by weight, compared to the total weight of the solvent, for example in an amount of 0.1% to 20% by weight, preferably 5% to 15% by weight, compared to the total weight of the solvent, in order to optimise the properties of the inks. These minority solvents may be chosen from among the esters, the ethers of ethylene glycol or of propylene glycol, and the acetals.

The dye(s) and/or pigment(s) may be chosen from among all the dyes or pigments suitable for the sought use, known to the man skilled in the art; some of these pigments or dyes have already been mentioned above.

The dyes and the pigments will generally be chosen from among the dyes and pigments known under the name "C. I. Solvent Dyes" and "C. I. Pigments".

As an example of the most common pigments and dyes, the following may be mentioned: C.I. Solvent Black 7, C. I. Solvent Black 29, C. I. Solvent Black 27, C. I. Solvent Black 28, C. I. Solvent Black 35, C. I. Solvent Blue 45, C. I. Solvent Blue 70, C. I. Solvent Red 124, the dispersions of Pigment Blue 60, of Pigment Black 7, of Pigment White 6 or of Pigment Blue 15; or else the fluorescent dyes; and the optical brighteners.

The pigments also include lacquers.

When it is desired that the markings obtained with the ink composition according to the invention should be water-resistant, a dye will preferably be chosen with the lowest water solubility, which is insoluble in water.

The expression "dye which is insoluble in water" is generally understood to mean a dye which, added in an amount of 1% to demineralised water, causes no colouration of the water visible to the eye.

The dye(s) is/are advantageously chosen from among the organic dye(s) which are soluble in ketones.

The pigment(s) may advantageously be chosen from among carbon blacks, titanium oxides, and mixtures thereof.

A preferred dye is C.I. Solvent Black 27.

The total amount of dye(s) and/or of pigment(s) is generally 0.05% to 25% by weight, preferably 1% to 20% by weight, more preferably 3% to 10% by weight, of the total weight of the ink composition.

The ink composition may further comprise one or more plasticiser(s) (of the resin(s) or polymer(s) or compounds of the binder) chosen, for example, from among the plasticisers known to the man skilled in the art, and chosen according to the binder used comprising one or more polymer(s) and/or resin(s); as plasticisers may, for example, be cited thermoplastic polyurethanes, phthalates, adipates, citrates and esters of citric acid, alkyl phosphates, glycerol, lactic acid, oleic acid, polypropylene glycol, triglycerides of fatty acids, levulinic acid; and mixtures thereof.

The plasticiser(s) is/are generally present in an amount of at least 0.05% by weight, preferably 0.1% to 20% by weight, of the total weight of the ink composition.

The ink composition according to the invention may also optionally comprise at least one conductivity salt.

Indeed, since the ink composition according to the invention is applied by continuous deflected jet, it must have sufficient electrical conductivity, generally greater than 5 µS/cm at 20° C., preferably greater than or equal to 300 µS/cm at 20° C., and more preferably greater than or equal to 500 µS/cm at 20° C.

The conductivity of the ink composition according to the invention may be, for example, 5 to 5000 µS/cm at 20° C., notably 500 to 2000 µS/cm at 20° C.

The products imparting the ink with the conductivity required for continuous jet spraying are ionisable compounds, such as salts. It is possible that dyes, pigments, or other ingredients of the ink are themselves salts, and give the ink sufficient conductivity for there to be no requirement to add a conductivity salt as such: this is the case notably of compounds known by the name "C. I. Solvent Black 27, 29, 35 and 45", already mentioned above.

However, it will often be necessary to include, in the ink composition, at least one conductivity salt which is different from the dyes, pigments and other ingredients.

The expression "conductivity salt" is understood to mean a salt which gives the ink composition electrical conductivity.

This/these conductivity salt(s) is/are generally chosen from among the salts of alkaline metals, alkaline earths and simple or quaternary ammonium compounds, in the form of nitrates, thiocyanates, formates, acetates, sulphates, propionates, hexafluorophosphates, hexafluoroantimonates, etc.

When the markings obtained with the ink composition must be water-resistant, this/these conductivity salt(s) will be chosen from among those which are insoluble in water (i.e., generally, the solubility of which in water is less than 0.5% by weight), such as the quaternary ammonium compounds with a fatty chain and the hexafluorophosphates or hexafluroantimonates.

This/these conductivity salt(s) will be present, if necessary, in the ink composition so as to give the ink the above conductivity, generally in an amount of at least 0.05% by weight, preferably 0.1% to 20% by weight, more preferably 0.1% to 10% by weight, and better still 0.1% to 5% by weight, of the total weight of the ink composition.

The composition according to the invention may further comprise one or more additive(s) chosen from among the compounds which improve the solubility of certain of these components, the printing quality, the adherence, or else the control of the wetting of the ink on different supports.

The additive(s) may be chosen, for example, from among the anti-foaming agents; the chemical stabilizers; the ultra-violet stabilizers; the surfactants, such as Fluorad® FC 430 or Byk® 333; the agents inhibiting the corrosion by the salts; the bactericides, the fungicides and the biocides; and the pH-regulating buffers, etc.

The additive(s) is/are used in very low doses, generally less than or equal to 5% and sometimes as low as 0.01%, depending on whether they are anti-foaming agents, stabilizers or surfactants.

The invention also relates to a method of marking a substrate, support or object by spraying on a surface of this substrate, support or object an ink composition by the continuous deflected ink jet technique in which the sprayed ink composition is the ink composition according to the invention as described above.

Before spraying the ink composition, the surface of the substrate, support or object is not generally subjected to any surface treatment other than simple cleaning. In other words, the surface is not subjected to any activation treatment.

The invention also relates to a substrate, support or object provided with a marking obtained by drying, and/or absorption in the substrate, support or object, of the ink composition according to the invention.

This substrate may be porous or non-porous.

This substrate may be made of metal, for example aluminium or steel; of glass; of ceramic; of a material containing cellulose such as paper, optionally coated or glazed, of cardboard or of wood; of organic polymer, notably of thermoplastic polymer, preferably chosen from among the PVCs, the PETs, the polyolefins, such as the polyethylenes (PE), and the polypropylenes (PP); of poly(methyl methacrylate) or PMMA, also called "Plexiglas"; of fabric; or of any other non-porous or porous substance, or of a composite of several of the above materials.

A preferred substrate is a substrate made of polyolefin, for example made of polyethylene.

The substrate, or rather the surface of the substrate provided with the marking, may be of any shape, even a complex shape; it may in particular be a curved surface, for example of the surface of a packaging or container, such as a bottle, or the surface of a stopper, cap.

Markings and printing are obtained which are of excellent quality and resistant on all substrates, even substrates having very low porosities, particularly on substrates made of polyolefins, for example made of polyethylene, even of complex shapes such as packaging or containers such as bottles, or stoppers; made of a polyolefin, for example made of a polyethylene or of a polypropylene.

The invention will be better understood on reading the following description of embodiments of the invention, given as illustrative, not restrictive, examples.

EXAMPLES

Ink compositions were prepared by mixing the products mentioned in table I below, in the stated proportions. The viscosities and conductivities of the obtained inks are also given in Table I below.

The ink compositions of examples n° 1 and n° 2 are ink compositions according to the invention.

The ink composition of the comparative example is an ink composition which contains no terpene-phenol resin, and which is not in accordance with the invention.

TABLE I

| Constituents (percentages by mass) | Comparative example | Example N°1 | Example N°2 |
|---|---|---|---|
| Methyl-ethyl ketone | 79.3 | 77.3 | 76.3 |
| Terpene-Phenol resin (Dertophene T ® of DRT) | 0 | 3 | 3 |
| Polyester resin (Vylon GK 250 ® of Toyobo) | 14 | 14 | 14 |
| Byk ® - UV 3500 | | 0.7 | |
| Byk ® - Silclean 3710 | 0.7 | | 0.7 |
| Solvent Black 27 (Neozapon noir X51) | 6 | 5 | 6 |
| Viscosity (mPa · s) | 3.86 | 4.35 | 4.44 |
| Conductivity (µS/cm). | 730 | 525 | 651 |

The inks prepared in this manner were deposited using Markem-Imaje® 9040 printers, which use the technique of continuous deflected jet printing, on polyethylene bottles.

On identical bottles, made of polyethylene, Markem-Imaje® inks referenced 5182 and 5506, and the composition of the comparative example were deposited using Markem-Imaje® 9040 printers. These inks act as controls or comparatives, since they are currently used for this polyethylene stoppers marking application.

Comparative inks 5182 and 5506 include neither terpene-phenol resin, nor polyester resin. The ink of the comparative example contains no terpene-phenol resin.

After 24 hours' drying, the markings on the polyethylene bottles were successively:
- rubbed with a finger by making 10 back and forth movements;
- subjected to soaking for several minutes in water or in soapy water, and the same rubbing test was repeated;
- rubbed with a piece of cotton soaked with ethanol;
- subjected to the "scotch" test.

The results are summarised in the following table II:

TABLE II

| Ink | Comparative Ink 5506 | Comparative Ink 5182 | Ink of the comparative example | Ink of example N°1 | Ink of example N°2 |
|---|---|---|---|---|---|
| Rubbing with a finger, 10 back and forth movements | 5 | 5 | 5 | 5 | 5 |
| Rubbing with a finger, 10 back and forth movements after soaking in water | 5 | 5 | 5 | 5 | 5 |
| Rubbing with a finger, 10 back and forth movements after soaking in water + soap | 5 | 5 | 5 | 5 | 5 |
| "Scotch" ® adhesive strip test | 2 | 2 | 4-5 | 4-5 | 5 |
| Rubbing test with ethanol | 4 | 1 | 4-5 | 5 | 5 |

The results of the tests were marked using a marking scale ranging from 1 to 5.

Mark:
5=marking unchanged
4=20% of marking damaged
3=50% of marking damaged or erased
2=80% of marking damaged or erased
1=Marking totally erased The inks of examples 1 and 2 in accordance with the invention show much better performance than comparative inks 5182 and 5506, and the ink of the comparative example.

What is claimed is:

1. An ink composition for continuous deflected ink jet printing, which is liquid at ambient temperature, comprising:
   a) a solvent comprising one or more organic solvent compound(s), and optionally water;
   b) a binder, comprising a saturated copolyester resin and a terpene-phenol resin;
   c) a compound having an ethylenically unsaturated double bond and a silicon chain;
   d) optionally, one or more dye(s) and/or pigment(s).

2. An ink composition according to claim 1, which is free of halogenated compounds.

3. An ink composition according to claim 1, which comprises 0.1% to 30% by weight, of the total weight of the ink composition, of the saturated copolyester resin.

4. An ink composition according to claim 1, which comprises 0.1% to 15% by weight, of the total weight of the ink composition, of the terpene-phenol resin.

5. An ink composition according to claim 1, which comprises 0.01% to 5% by weight, of the total weight of the ink composition, of the compound having an ethylenically unsaturated double bond and a silicon chain.

6. An ink composition according to claim 1, in which the binder represents 1% to 45% by weight of the total weight of the ink composition.

7. An ink composition according to claim 1, comprising less than 10% by weight of water, compared to the total weight of the ink composition.

8. An ink composition according to claim 1, in which the solvent represents at least 20% by weight of the total weight of the ink composition.

9. An ink composition according to claim 1, in which the said organic solvent compound(s) comprise(s) a majority proportion by weight, compared to the total weight of the solvent, of one or more volatile organic solvent compound(s), and a minority proportion by weight, compared to the total weight of the solvent, of one or more non-volatile organic solvent compound(s).

10. An ink composition according to claim 1, in which the solvent comprises a majority amount by weight, compared to the total weight of the solvent of one or more solvent compound(s) selected from the group consisting of ketones with 3 to 10 carbon atoms.

11. An ink composition according to claim 10, further comprising one or more solvent compound(s) other than the ketone(s) in a minority total amount by weight, compared to the total weight of the solvent.

12. An ink composition according to claim 1, in which said dye(s) and/or pigment(s) is/are selected from the group consisting of "C.I. Solvent Dyes", "C.I. Pigments", "fluorescent dyes, and optical brighteners".

13. An ink composition according to claim 1, in which the total amount of dye(s) and/or of pigment(s) is 0.05% to 25% by weight of the total weight of the ink composition.

14. An ink composition according to claim 1, further comprising one or more plasticiser(s).

15. An ink composition according to claim 1, which has an electrical conductivity greater than 5 µS/cm at 20° C.

16. An ink composition according to claim 1, further comprising at least one conductivity salt.

17. An ink composition according to claim 16, in which the conductivity salt(s) is/are present in an amount of at least 0.05% by weight of the total weight of the ink composition.

18. An ink composition according to claim 1, further comprising one or more additive(s) selected from the group consisting of foaming agents; chemical stabilizers; ultraviolet stabilizers; surfactants; agents inhibiting corrosion; bactericides; fungicides; biocides and pH-regulating buffers.

19. A method for marking a substrate, support or object by spraying on a surface of this substrate, support or object an ink composition by the continuous deflected ink jet technique, in which the sprayed ink composition is the ink composition according to claim 1.

20. A method according to claim 19, in which, before spraying the ink composition, the surface of the substrate, support or object is not subjected to any surface treatment other than simple cleaning.

21. A substrate, support or object provided with a marking obtained by drying, and/or absorption in the substrate, support or object, of the ink composition according to claim 1.

22. A substrate, support or object, according to claim 21, which is made of metal; of glass; of ceramic; of a material containing cellulose; of organic polymer; of poly(methyl methacrylate) PMMA; of fabric; or of any other non-porous or porous substance, or of a composite of several of the above materials.

23. A substrate, support or object according to claim 22, which is a packaging or container, such as a bottle; or a stopper; made of a polyolefin.

24. An ink composition according to claim 12, wherein the "C. I. Solvent Dyes" are selected from the group consisting of C. I. Solvent Black 29, C. I. Solvent Black 27, C. I. Solvent Black 7, C. I. Solvent Black 28, C. I. Solvent Black 35, C. I. Solvent Blue 45, C. I. Solvent Blue 70, and C. I. Solvent Red 124, and the "C. I. Pigments" are selected from the group consisting of Pigment Blue 60, Pigment Blue 15, Pigment Black 7, and Pigment White 6.

25. An ink composition according to claim 16, wherein said at least one conductivity salt is selected from the group consisting of conductivity salts which are insoluble in water.

\* \* \* \* \*